United States Patent [19]

Nikaido et al.

[11] 3,972,845

[45] Aug. 3, 1976

[54] AQUEOUS COATING COMPOSITIONS COMPRISING POLYCARBOXYLIC ACID RESIN, PHENOL RESIN AND COPPER COMPOUND

[75] Inventors: Norio Nikaido; Mototaka Iihashi, both of Hiratsuka, Japan

[73] Assignee: Kansai Paint Company, Ltd., Japan

[22] Filed: Nov. 4, 1974

[21] Appl. No.: 520,857

[30] Foreign Application Priority Data
July 16, 1974   Japan.................................. 49-81381

[52] U.S. Cl. .............................. 260/19 UA; 260/20; 260/29.2 EP; 260/29.2 UA; 260/29.2 E; 260/29.3; 260/29.6 NR
[51] Int. Cl.²............................................. C09D 3/56
[58] Field of Search................ 260/19 UA, 20, 29.3, 260/45.75 C

[56] References Cited
UNITED STATES PATENTS

| | | | |
|---|---|---|---|
| 2,681,894 | 6/1954 | Hoenel.................................. | 260/20 |
| 3,188,363 | 6/1965 | Amidon et al. .............. | 260/45.75 C |
| 3,266,913 | 8/1966 | Hardy et al................... | 260/45.75 C |
| 3,360,589 | 12/1967 | Raichle et al................ | 260/45.75 C |
| 3,492,256 | 1/1970 | Kapalko et al........................ | 260/20 |
| 3,627,657 | 12/1971 | Nistri et al. .................. | 260/45.75 C |
| 3,650,996 | 3/1972 | Guldenpfennig...................... | 260/20 |
| 3,671,474 | 6/1972 | Van Westrenen .................... | 260/20 |
| 3,679,615 | 7/1972 | Gilchrist.......................... | 260/19 UA |
| 3,779,961 | 12/1973 | Dhein et al. .................... | 260/19 UA |

FOREIGN PATENTS OR APPLICATIONS

| | | | |
|---|---|---|---|
| 1,224,488 | 9/1966 | Germany...................... | 260/45.75 C |
| 1,033,999 | 6/1966 | United Kingdom.......... | 260/45.75 C |

*Primary Examiner*—Ronald W. Griffin
*Attorney, Agent, or Firm*—Larson, Taylor and Hinds

[57] ABSTRACT

In an aqueous coating composition comprising an aqueous medium having dispersed therein an unsaturated polycarboxylic acid resin neutralized with a base and a resol-type phenolic resin, an improvement characterized in that said composition further contains a copper compound dispersed in the aqueous medium in an amount of 0.0005 to 5% by weight in terms of copper metal, based on said polycarboxylic acid resin.

2 Claims, No Drawings

AQUEOUS COATING COMPOSITIONS COMPRISING POLYCARBOXYLIC ACID RESIN, PHENOL RESIN AND COPPER COMPOUND

This invention relates to an aqueous coating composition, more particularly to an aqueous coating composition predominantly comprising polycarboxylic acid resin and resol-type phenolic resin.

It is well known to use as binders for coating compositions drying oils, fatty acids of drying oils, synthetic resins modified with these materials, diene polymers and like high molecular weight substances having unsaturated bonds in the molecule. It is also practiced to introduce carboxyl groups into such high molecular weight substances to prepare polycarboxylic acid resins, which are then neutralized with a base such as alkali metal hydroxides, ammonia or organic amines for use as a binder for aqueous coating compositions. The coating composition is used as a primer for protecting substrate metal from corrosion. To improve the corrosion resistance of the coating obtained from the aqueous coating composition, a hexavalent chromium compound such as strontium chromate is added to the composition. However, the use of the hexavalent chromium compound which is harmful to the human body is now under restrictions from environmental viewpoint to control pollution, whilst the oxidative action of the compound is liable to oxidize unsaturated double bonds in the unsaturated polycarboxylic acid resin used as a binder to impair the cross linking ability of the resin.

It is further known to improve the corrosion resistance by the addition of resol-type phenolic resin which causes no environmental pollution. However, according to this method the corrosion resistance is not sufficiently improved, and when conjointly used with unsaturated polycarboxylic acid resin, such phenolic resin deteriorates the cross linking ability, namely curability, of unsaturated polycarboxylic acid resin, because the resol-type phenolic resin has a reducing property. As a result, the coating film obtained therefrom is poor in hardness.

An object of this invention is to overcome the drawbacks heretofore experienced with the aqueous coating composition containing polycarboxylic acid resin having unsaturated double bonds and resol-type phenolic resin.

Another object of this invention is to provide an aqueous coating composition capable of producing a coating having excellent corrosion resistance and hardness.

Other objects and features of this invention will become apparent from the following description. In an aqueous coating composition comprising an aqueous medium having dispersed therein an unsaturated polycarboxylic acid resin neutralized with a base and a resol-type phenolic resin, the present aqueous coating composition is characterized in that it further contains a copper compound dispersed in the aqueous medium in an amount of 0.0005 to 5% by weight based on the polycarboxylic acid resin.

According to our researches it has been revealed that when a copper compound is used in combination with a resol-type phenolic resin, the coating obtained from the resulting composition is markedly improved in corrosion resistance. Moreover, on the contrary to the common concept that the resol-type phenolic resin acts to suppress the curability of unsaturated polycarboxylic acid resin and copper compound also acts similarly on unsaturated polycarboxylic acid resin, our researches have revealed a surprising fact that when used conjointly, they act quite conversely to improve the curability of the resin with the results that a coating having excellent hardness and surface smoothness can be obtained. This invention has been accomplished based on this novel finding.

The unsaturated polycarboxylic acid resin to be used in this invention has unsaturated bonds and carboxyl groups in the molecule. Usable as such resin are those conventionally known such as maleinized product of drying oil, polyester resin having at least one carboxyl group, maleinized reaction product of epoxy-resin esters, alkyd modified with fatty acid, maleinized polybutadiene, etc. Among these unsaturated polycarboxylic acid resins, preferable are those having an iodine value of at least 20, preferably at least 50 and an acid value of at least 20, preferably at least 30.

The polycarboxylic acid resin is applied to coating in a form of a salt neutralized by a base such as an alkali metal hydroxides, ammonia or organic amines. Examples of the alkali metal hydroxides are sodium hydroxide and potassium hydroxide. The organic amines include, for example, monoethanolamine, diethanolamine, triethanolamine and like alkanol amines, triethylamine, diethylamine, monoethylamine, diisopropylamine, trimethylamine, diisobutylamine and like alkylamines, dimethylaminoethanol and like alkylalkanol amines, cyclohexylamine and like alicyclic amines. These bases are used singly, or at least two of them are usable in admixture. The neutralization with the base can be conducted in a conventional manner, for example, by mixing an aqueous solution of the base with the polycarboxylic acid resin at a temperature of up to 100°C. This neutralization may be carried out before or after the polycarboxylic acid resin is mixed with the resol-type phenolic resin.

The resol-type phenolic resin to be used in the invention is also conventional in the art. Examples thereof are those containing 1 to 4, preferably 1 to 3, methylol groups in the molecule and prepared, for example, by reacting formaldehyde with phenols such as phenol, m-cresol, resorcinol, p-cresol, p-tertiary-butylphenol, p-butylphenol, p-tertiary-amylphenol, p-phenylphenol, bisphenol A, etc. Although the amount of the phenolic resin to be used in the invention varies in accordance with the kind and amount of polycarboxylic acid resin used, it is usually in the range of about 1 to about 50% by weight, preferably about 3 to about 30% by weight, based on the weight of the polycarboxylic acid resin.

The copper compounds to be used in this invention include various copper-containing compounds such as, for example, copper salts of organic and inorganic acids, copper oxides, copper hydroxides and the like. The organic acid salts include copper salts of aromatic or aliphatic mono- or poly-carboxylic acids having less than 25 carbon atoms. Examples of these salts are copper naphthenate, copper benzoate, copper laurate, copper palmitate, copper stearate, copper oleate, copper abietinate, copper salt of maleinized oleic acid or fumaric tung oil, etc. Examples of the salts of inorganic acids are copper sulfate, copper chloride, copper phosphate, copper chromate, basic copper carbonate, etc.

The copper compound is used in an amount of 0.0005 to 5% by weight, preferably of about 0.001 to 3% by weight, in terms of metal copper based on the polycarboxylic acid resin. If the copper compound is used in an amount less than 0.0005% by weight, the curability of the resulting composition will be poor, whilst the use of the amount more than 5% by weight will reduce the water- and humidity-resistant properties of the coating film obtained from the resulting composition.

The aqueous medium to be used in this invention is water or a mixture of water and organic solvent which is miscible with water. A wide variety of organic solvents are usable as far as they are miscible with water, examples being ethyl alcohol, isopropyl alcohol, secondary butyl alcohol and like monohydric alcohols having not more than 5 carbon atoms, ethylene glycol monoethyl ether and like ethylene glycol monoalkyl ethers, methylethyl ketone, diisobutyl ketone and like dialkyl ketones, ethyl acetate, butyl acetate and like esters of aliphatic monocarboxylic acids of not more than 3 carbon atoms and aliphatic alcohols of not more than 4 carbon atoms, diacetone alcohol, diacetone alcohol methyl ether, etc. The organic solvent can be used in an amount of not more than 50% by weight, based on the water.

The aqueous coating composition of this invention may contain various known additives such as coloring pigment, anti-corrosive pigment, extender pigment, cross linking agent for the polycarboxylic acid resin, dispersant, stabilizer, etc. Examples of coloring pigment are titanium oxide, iron oxide (red iron oxide), carbon black, and various other known coloring pigments. Examples of extender pigment are clay, silica, talc, calcium carbonate and various other known extender pigments.

The aqueous coating composition of the present invention is used for coating by a usual coating methods such as immersion, brush, spray coating, electrophoretic coating or the like. In particular, electrophoretic coating is the most preferable.

The present invention will be described below with reference to examples, in which the parts and percentages are by weight.

EXAMPLE 1

To 2,640 parts of linseed oil are added 588 parts of maleic anhydride and 0.03 part of xylene, and the mixture is reacted at 200°C under nitrogen atmosphere until the amount of free maleic anhydride reduced to not more than 1.0%. To the reaction mixture thereafter cooled to 120°C is added 250 parts of ethanol, and the mixture is reacted at 120°C for 1.5 hours to obtain a half ester of maleinized linseed oil having an acid value of 100. To the half ester (1,000 parts) is added 30 parts of copper hydroxide (2.0% by weight as metal copper to the half ester), followed by mixing at 100°C for 2 hours. After cooling the resulting mixture to 80°C, 370 parts of ethylene glycol monoethyl ether is added to dilute the mixture to 70% solids. The diluted mixture is then cooled to room temperature, and 143 parts of 70% aqueous solution of monomethylolated phenolic resin (trade mark: "WP-71", product of Gunei Chemical Industries, Ltd., Japan) is added. To the mixture are further added 105 parts of triethylamine and 1,438 parts of deionized water for neutralization, followed by stirring at room temperature to prepare an aqueous varnish containing 35% of resin solids.

COMPARISON EXAMPLE 1

The half ester (1,000 parts) of maleinized linseed oil obtained in Example 1 is diluted with 357 parts of ethylene glycol monoethyl ether to 70% solids. Subsequently 105 parts of triethylamine and 1,252 parts of deionized water are added to the dilute mixture at room temperature for neutralization, and the mixture is stirred at room temperature to prepare an aqueous varnish of 35% resin solids.

COMPARISON EXAMPLE 2

To the half ester (1,000 parts) of maleinized linseed oil obtained in Example 1 are added 357 parts of ethylene glycol monoethyl ether and 143 parts of 70% aqueous solution of monomethylolated phenolic resin (the same as in Example 1), and the mixture is stirred at room temperature. Subsequently, 105 parts of triethylamine and 1,395 parts of deionized water are further added for neutralization. The resulting mixture is stirred at room temperature to prepare an aqueous varnish of 35% resin solids.

COMPARISON EXAMPLE 3

To 1,000 parts of the half ester of maleinized linseed oil obtained in Example 1 is added 30 parts of copper hydroxide (2.0% by weight as metal copper to the half ester), and the mixture is heated at 100°C for 2 hours with stirring. The mixture is cooled to 80°C and then diluted with 370 parts of ethylene glycol monoethyl ether to 70% solids. To the dilution thereafter cooled to room temperature are added 105 parts of triethylamine and 1,295 parts of deionized water for neutralization, and the mixture is stirred at room temperature to prepare an aqueous varnish of 35% resin solids.

Each of the aqueous varnishes prepared in Example 1, Comparison Examples 1, 2 and 3 is diluted with deionized water to a concentration of 10% solids to obtain an electrophoretic coating bath.

A mild steel panel treated with zinc phosphate (trade mark: "Bonderite No. 37", product of Nihon Parkerizing Co., Ltd., Japan) serving as an anode and a non-treated mild steel panel serving as a cathode are placed in the bath as spaced apart by 15 cm. Electrophoretic coating operation is conducted under the following conditions:

| | |
|---|---|
| ratio of electrode area | 1 : 1 |
| coating area | 200 cm² |
| current application time | 2 minutes |
| power source | three-phase full wave rectified current |
| thickness of coating | 25 μ |

After the operation, the coated panel is washed with water and heated at 170°C for 30 minutes to obtain a test panel. The state of the surface of coated test panel is evaluated and the hardness and corrosion resistance of the panel are determined in the following manner. The results are given in Table 1.

1. State of coating surface:

The surface of the coating is inspected with the unaided eye to check for smoothness, cissing and indentations and is evaluated according to the following criteria:

A: smooth and free of cissing and indentations,

B: slightly poor in smoothness but almost free of cissing and indentations.

C: lacking smoothness and uneven.

2. Pencil hardness:
Measured in accordance with JIS K 5400.
3. Corrosion resistance:
A diagonal incision is made in the test panel with a knife through the coating up to the substrate. The test panel is then placed in a salt spray tester at 35°C in which 5% aqueous solution of sodium chloride is used. The time taken for rust to develop over the distance of 3 mm from the incision is measured.

Table 1

| Sample | Ex. 1 | Comp. Ex. 1 | Comp. Ex. 2 | Comp. Ex. 3 |
|---|---|---|---|---|
| State of coating surface | A | C | C | B |
| Hardness | H | F | B | 2B |
| Corrosion resistance (hours) | At least 350 | 96 | 196 | 96 |

Table 1 shows that the aqueous coating composition of this invention produces an electrophoretic coating having excellent corrosion resistance which is much higher than that given by the use of the known carboxyl acid resin (Comparison Example 1), or by the use of the same in combination with phenolic resin (Comparison Example 2) or by the conjoint use of polycarboxylic acid resin and copper compound (Comparison Example 3). Also is shown that the coating obtained in Example 1 is higher in hardness and more excellent in surface smoothness than those obtained in Comparison Examples 1 to 3.

EXAMPLE 2

To 1,781 parts of an ester obtained by reacting 2,105 parts of linseed oil fatty acid and 752 parts of epoxy resin (trade mark: "Epikote 828", product of Shell Chemical Co., Ltd., U.S.) are added 446 parts of maleic anhydride and 20 ml of xylene, and the mixture is reacted at 200°C under nitrogen atmosphere until the amount of free maleic anhydride reduced to not more than 1.0%. To the reaction mixture thereafter cooled to 140°C is added 180 parts of n-butanol, and the mixture is reacted at 140°C for 1 hour to obtain a half ester of maleinized epoxy ester having an acid value of 99.5. The ester is cooled to 100°C and then diluted with 893 parts of ethylene glycol monoethyl ether to 70% solids.

At room temperature, to 1,430 parts of the abovementioned half ester of maleinized epoxy resin is added 1 part of xylene solution of copper naphthenate containing 5% of metal copper (0.005% by weight as metal copper to the half ester). After stirring the mixture, 143 parts of 70% aqueous solution of dimethylolated bisphenol A (resol resin) is mixed therewith. Subsequently 145 parts of 40% aqueous solution of potassium hydroxide and 928 parts of deionized water are further added for neutralization, and the resulting mixture is stirred at room temperature to prepare an aqueous varnish of 40% solids.

COMPARISON EXAMPLE 4

To 1,430 parts of 70% ethylene glycol monobutyl ether solution of the half ester of maleinized epoxy ester obtained in Example 2 are added 145 parts of 40% aqueous solution of potassium hydroxide and 1,060 parts of deionized water for neutralization, and the mixture is stirred at room temperature to prepare an aqueous varnish of 40% solids.

COMPARISON EXAMPLE 5

To 1,430 parts of 70% ethylene glycol monobutyl ether solution of the half ester of maleinized epoxy ester obtained in Example 2 is added 143 parts of 70% aqueous solution of dimethylolated bisphenol A (the same as in Example 2), followed by further addition of 145 parts of 40% aqueous solution of potassium hydroxide and 1,178 parts of deionized water for neutralization, and the mixture is stirred at room temperature to prepare an aqueous varnish of 40% solids.

COMPARISON EXAMPLE 6

To 1,430 parts of 70% ethylene glycol monobutyl ether solution of the half ester of maleinized epoxy ester obtained in Example 2 is added 1 part of xylene solution of copper naphthenate containing 5% of metal copper (0.005% by weight as metal copper to the half ester), and the mixture is stirred at room temperature. Subsequently 145 parts of 40% aqueous solution of potassium hydroxide and 1,127 parts of deionized water are added for neutralization. The resulting mixture is stirred to prepare an aqueous varnish of 40% solids.

Each of the aqueous varnishes prepared in Example 2, Comparison Examples 4, 5 and 6 is formulated into an electrophoretic coating bath in the same manner as in Example 1, the properties of which are tested. Test panel is prepared and tested in the same manner as above. The results are listed in Table 2 below.

Table 2

| Sample | Ex. 2 | Comp. Ex. 4 | Comp. Ex. 5 | Comp. Ex. 6 |
|---|---|---|---|---|
| State of coating surface | A | B | B | B |
| Hardness | H | F | B | B |
| Corrosion resistance (hours) | At least 320 | 72 | 148 | 72 |

Table 2 reveals that the varnish prepared from the aqueous coating composition of this invention (Example 2) gives high corrosion resistance, high hardness and excellent surface smoothness.

EXAMPLE 3

To 1,430 parts of 70% ethylene glycol monobutyl ether solution of the half ester of maleinized epoxy ester obtained in Example 2 are added 112 parts of diethanolamine and 958 parts of deionized water for neutralization, and the mixture is stirred at room temperature to prepare an aqueous varnish of 40% solids.

To 100 parts of the aqueous varnish are added 25 parts of titanium white, 1 part of carbon black, 0.2 part of copper hydroxide and 0.2 part of copper oxide (0.3% by weight as metal copper to the half ester). The mixture is treated in a ball mill for 20 hours to prepare a dispersion.

To 126.5 parts of the dispersion are added 150 parts of the 40% aqueous varnish and 10 parts of monomethylolated product of 70% p-tertiary-butyl phenol, and the mixture is stirred at room temperature for 30 minutes and thereafter diluted with deionized water to 10% to prepare an aqueous coating composition.

EXAMPLE 4

To 60 parts of linseed oil are added 100 parts of 1,2-polybutadiene (having a molecular weight of 1,200 and containing 89% 1,2-vinyl bonds and 11% trans 1,4 bonds), 32 parts of maleic anhydride and 2 parts of xylene, and the mixture is reacted at 200°C under nitrogen atmosphere until the amount of free maleic acid reduced to not more than 1.0%. To the reaction mixture thereafter cooled to 140°C is added 20 parts of n-butanol. The resulting mixture is reacted at 140°C for 1 hour and then cooled to 100°C and thereafter diluted with ethylene glycol monoethyl ether to 70% resin solids.

To 100 parts of the 70% solution of resin thus obtained are added 8 parts of triethylamine and 126 parts of distilled water for neutralization to prepare an aqueous dispersion containing 30% of resin.

To 100 parts of the 30% resin dispersion are added 30 parts of iron oxide and 1 part of carbon black. The mixture is dispersed with a ball mill for 20 hours to prepare a uniform dispersion.

To 100 parts of the dispersion are added 200 parts of the above-mentioned 30% aqueous dispersion of resin and 30 parts of 70% ethylene glycol monobutyl ether solution of reaction product of the half ester of maleinized linseed oil obtained in Example 1 with copper hydroxide (0.5% by weight as metal copper to the half ester), followed by further addition of 10 parts of 70% aqueous solution of monomethylolated phenolic resin. The mixture is stirred at room temperature for 30 minutes and then diluted with deionized water to 12% to prepare an aqueous coating composition.

The aqueous coating compositions obtained in Examples 3 and 4 are used for electrophoretic coating operation under the same conditions as in Example 1. The test results are listed in Table 3 below.

Table 3

| Sample | Example 3 | Example 4 |
|---|---|---|
| State of coating surface | A | A |
| Hardness | H | 2H |
| Corrosion resistance (hours) | At least 480 | At least 480 |

The test panels used are those treated with zinc phosphate, "Bonderite No. 37" (trade mark: a chemical conversion coating of Nihon Parkerizing Co., Ltd., Japan).

EXAMPLES 5 TO 8

To 650 parts of "RJ-100" (trade mark: a copolymer of allyl alcohol and styrene produced by Monsanto Chemical Co., Japan) are added 680 parts of Linseed oil fatty acid, and the mixture is reacted at 220°C under reflux of xylene until the acid value reached to 10. To 800 parts of esterified product thus obtained are added 100 parts of dehydrated castor oil, 100 parts of soy bean oil, 200 parts of maleic anhydride and 20 parts of xylene, and the mixture is reacted at 190°C under nitrogen atmosphere until the amount of free maleic anhydride reduced to not more than 1.0%. To the reaction mixture thereafter cooled to 150°C is added 520 parts of ethylene glycol monoethyl ether, and the mixture is reacted at 150°C for 1 hour, and then cooled to room temperature to obtain a 70% solution of half ester of maleinized product.

To 1,430 parts of 70% resin solution are added 120 parts of triethyl amine and 950 parts of deionized water for neutralization, and the resulting mixture is stirred at room temperature to prepare an aqueous varnish of 40% solids.

Then, to 250 parts of the 40% aqueous varnish are added titanium dioxide, iron oxide and copper stearate in the ratio shown in following Table 4 and the mixture is dispersed with a ball mill for 20 hours. To 280 parts of the dispersion are added 10 parts of 70% aqueous solution of monomethylolated phenolic resin, and the mixture is stirred at room temperature for 30 minutes and thereafter diluted with deionized water to prepare an aqueous coating composition having a solid concentration of 10%.

Table 4

| | Ex. 5 (parts) | Ex. 6 (parts) | Ex. 7 (parts) | Ex. 8 (parts) |
|---|---|---|---|---|
| 40% aqueous varnish | 250 | 250 | 250 | 250 |
| $TiO_2$ | 10 | 10 | 10 | 10 |
| $Fe_2O_3$ | 20 | 20 | 20 | 20 |
| Copper stearate (containing 10% metal copper) | 0.1 | 20 | 0.003 | 70 |
| Metal copper content to polycarboxylic acid resin (%) | 0.01 | 2.0 | 0.0003 | 7.0 |

The aqueous coating compositions obtained in Examples 5 to 8 are used for electrophoretic coating operation under the same conditions as in Example 1. The test results are listed in Table 5 below.

Table 5

| Sample | Ex. 5 | Ex. 6 | Ex. 7 | Ex. 8 |
|---|---|---|---|---|
| State of coating surface | A | A | A | B |
| Hardness | 2H | H | HB | F |
| Corrosion resistance (hours) | At least 480 | At least 480 | 164 | 216 |
| Water resistance* | Good | Good | Good | Softening and rust spotting |

Note:
*After specimen is immersed in deionized water of 40°C for 10 days, the state of coating is observed.

EXAMPLES 9 TO 19

Aqueous varnishes containing 35% of resin solids are prepared in the same manner as in Example 1 except that various copper compounds listed in Table 6 are used in place of copper hydroxide.

Each of the aqueous varnishes thus obtained is coated electrophoretically in the same manner as in Example 1. Each of the coating film thus obtained is excellent in surface smoothness and corrosion resistance and high in hardness.

Table 6

| Example No. | Copper compound |
|---|---|
| 9 | Copper benzoate |
| 10 | Copper laurate |
| 11 | Copper palmitate |
| 12 | Copper oleate |
| 13 | Copper abietinate |
| 14 | Copper oxide |
| 15 | Copper sulfate |
| 16 | Copper chloride |
| 17 | Copper phosphate |
| 18 | Copper chromate |

Table 6-continued

| Example No. | Copper compound |
|---|---|
| 19 | Basic copper carbonate |

What we claim is:

1. In an aqueous coating composition comprising an aqueous medium having dispersed therein an unsaturated polycarboxylic acid resin neutralized with a base and a phenol resol an improvement characterized in that said composition further contains a copper compound dispersed in the aqueous medium in an amount of 0.0005 to 5% by weight in terms of copper metal, based on said polycarboxylic acid resin, said polycarboxylic acid resin being at least one species selected from the group consisting of maleinized product of drying oil, polyester resin having at least one carboxyl group, maleinized reaction product of epoxy resin esters, alkyd resin modified with fatty acid and maleinized polybutadiene, and said copper compound being at least one species selected from the group consisting of copper naphthenate, copper benzoate, copper laurate, copper palmitate, copper stearate, copper oleate, copper abietinate, copper salt of maleinized oleic acid, copper salt of fumaric tung oil, copper hydroxides, copper oxides, copper sulfate, copper chlorides, copper phosphate, copper chromate and basic copper carbonate.

2. The aqueous coating composition according to claim 1, in which said copper compound is used in an amount of 0.001 to 3 weight percent in terms of copper metal based on the unsaturated polycarboxylic acid resin.

* * * * *